(12) United States Patent
Cholewo et al.

(10) Patent No.: US 7,359,090 B2
(45) Date of Patent: Apr. 15, 2008

(54) SHADING AN OPTICAL SENSING ELEMENT SUCH AS IN A SCANNER

(75) Inventors: Tomasz J. Cholewo, Lexington, KY (US); Brian W. Damon, Lexington, KY (US); Stuart W. Daniel, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 876 days.

(21) Appl. No.: 10/744,409

(22) Filed: Dec. 22, 2003

(65) Prior Publication Data

US 2005/0134937 A1 Jun. 23, 2005

(51) Int. Cl.
*H04N 1/40* (2006.01)
(52) U.S. Cl. .................................... 358/1.9; 358/461
(58) Field of Classification Search ................. 358/1.9, 358/2.1, 504, 406, 461
See application file for complete search history.

(56) References Cited

U.S. PATENT DOCUMENTS

| 4,821,099 | A | 4/1989 | Sakamoto |
| 5,038,225 | A | 8/1991 | Maeshima |
| 5,325,210 | A | 6/1994 | Takashima et al. |
| 5,331,428 | A | 7/1994 | Uffel |
| 5,644,409 | A | 7/1997 | Irie et al. |
| 5,771,106 | A | 6/1998 | Taguchi et al. |
| 5,926,579 | A | 7/1999 | Uejo et al. |
| 6,424,748 | B1* | 7/2002 | Ting-Shan ............... 382/254 |
| 6,430,378 | B1* | 8/2002 | Ozawa .................... 399/32 |
| 6,518,587 | B2 | 2/2003 | Rombola |
| 6,700,683 | B1* | 3/2004 | Hashizume ............ 358/461 |
| 2001/0030770 | A1 | 10/2001 | Ohashi |
| 2003/0038983 | A1 | 2/2003 | Tanabe et al. |
| 2006/0209360 | A1* | 9/2006 | Sakakibara ............ 358/474 |

FOREIGN PATENT DOCUMENTS

JP 05268474 A * 10/1993
JP 10164363 A * 6/1998

* cited by examiner

*Primary Examiner*—Thomas D. Lee
*Assistant Examiner*—Stephen Brinich
(74) *Attorney, Agent, or Firm*—Douglas E. Erickson (57) ABSTRACT

Method for shading one of a first plurality of sensing elements of an optical sensor. High-reflectivity and low-reflectivity reference values of the output signal of each of a second plurality of sensing elements of the sensor are obtained. An average or nominal high-reflectivity value of the high-reflectivity reference values for each sensing element of the second plurality is calculated. An average or nominal low-reflectivity value of the low-reflectivity reference values for each sensing element of the second plurality is calculated. An offset value for one of the sensing elements of the first plurality is calculated using at least the average or nominal high-reflectivity values and the average or nominal low-reflectivity values. The one sensing element of the first plurality is calibrated using at least the calculated offset value. In one example, the first plurality and the second plurality are identical.

25 Claims, 5 Drawing Sheets

SHADING AN OPTICAL SENSING ELEMENT SUCH AS IN A SCANNER

TECHNICAL FIELD

The present invention relates generally to optical sensing elements, such as optical sensing elements of a scan bar of an optical scanner, and more particularly to a method for shading an optical sensing element.

BACKGROUND OF THE INVENTION

Scanners are used to scan an image to create a scanned image which can be displayed on a computer monitor, which can be used by a computer program, which can be printed, which can be faxed, etc. One conventional method for scanning an image uses a scanner having a subscan axis, a scan bar having sensor elements (such as CCD [charge-coupled-device] elements), and a scan-bar shading calibration strip having a white area and a black area.

It is noted that each optical sensing element produces a signal proportional to the amount of light reaching the element. The proportion or "gain" of each element is related but not identical. In addition, the light source may not uniformly illuminate the document to be scanned. To get an image with a consistent representation, the elements must be individually calibrated (also referred to as "shaded") using a calibration strip with a white area and a black area.

To perform shading, the scan bar, including the sensor elements, is moved along the subscan axis over the white area and over the black area of the shading calibration strip, and white and black reference values of the output signal of the sensor elements are obtained. A gain is calculated for a particular sensor element by dividing the difference between desired white and black reference values by the difference between the average white and black reference values for the particular sensor element. Known techniques for calculating an average value for the white reference values of one CCD element include finding the median value, eliminating white (and/or black) reference values from optical defects on the white (and/or black) area of the shading calibration strip when doing the calculation, and calculating an average black value of the one CCD element. The one CCD element is shaded by calibrating a non-reference value of the output signal of the one sensing element by subtracting an offset, equal to the black average value of the one CCD element, from the non-reference value and then multiplying by the gain. Shading of the CCD elements compensates for varying amounts of illumination produced by a scanner light source in different regions of the scanned image and compensates for variations among the CCD elements of the scan bar. However, typically the black reference values are much noisier than the white reference values resulting in a too high offset which will produce unwanted darker vertical streaks when a scanned image is displayed and/or printed.

Another conventional method uses a shading calibration strip without a black area and obtains black reference values by not illuminating the shading calibration strip.

What is needed is an improved method for shading an optical sensing element such as an optical sensing element of a scanner.

SUMMARY OF THE INVENTION

A first method of the invention is for shading one of at least two optical sensing elements of a scan bar of an optical scanner having a shading calibration strip including a white area and a black area. The first method includes steps a) through e). Step a) includes obtaining white and black reference values of the output signal of each of the at-least-two optical sensing elements while relatively moving the scan bar over the white and black areas of the shading calibration strip. Step b) includes calculating an average white value of the white reference values for each of the at-least-two optical sensing elements. Step c) includes calculating an average black value of the black reference values for each of the at-least-two optical sensing elements. Step d) includes calculating a black offset value for the one optical sensing element by using a least squares linear regression algorithm to fit the curve of the average white values into the range of the average black values of the at-least-two optical sensing elements. Step e) includes calibrating the one optical sensing element using at least the black offset value calculated in step d).

A second method of the invention is for shading one of at least two optical sensing elements of a scan bar of an optical scanner having a shading reference target including a white area and a black area. The second method includes steps a) through e). Step a) includes obtaining white and black reference values of the output signal of each of the at-lest-two optical sensing elements while relatively moving the scan bar over the white and black areas of the shading reference target. Step b) includes calculating an average white value of the white reference values for each of the at-least-two optical sensing elements. Step c) includes calculating an average black value of the black reference values for each of the at-least-two optical sensing elements. Step d) includes calculating an offset value for the one optical sensing element by using a fitting algorithm to fit the curve of one of the average white and black values into the range of the other of the average white and black values of the at-least-two optical sensing elements. Step e) includes calibrating the one optical sensing element using at least the offset value calculated in step d).

A third method of the invention is for shading one of at least two optical sensing elements of an optical sensor. The third method includes steps a) through e). Step a) includes obtaining high-reflectivity and low-reflectivity reference values of the output signal of each of the at-least-two optical sensing elements while relatively moving the optical sensor over a high-reflectivity target area and a low-reflectivity target area of a shading reference target. Step b) includes calculating an average high-reflectivity value of the high-reflectivity reference values for each of the at-least-two optical sensing elements. Step c) includes calculating an average low-reflectivity value of the low-reflectivity reference values for each of the at-least-two optical sensing elements. Step d) includes calculating an offset value for the one optical sensing element using at least the average high-reflectivity and low-reflectivity values of steps b) and c). Step e) includes calibrating the one optical sensing element using at least the offset value calculated in step d).

A fourth method of the invention is for shading one of at least two optical sensing elements of an optical sensor. The fourth method includes steps a) through f). Step a) includes obtaining first-reflectivity reference values of the output signal of each of the at-least-two optical sensing elements while relatively moving the optical sensor over a substantially illuminated target area of a shading reference target. Step b) includes obtaining second-reflectivity reference values of the output signal of each of the at-least-two optical sensing elements in a substantially non-illuminated environment. Step c) includes calculating an average first-reflectivity value of the first-reflectivity reference values for each of the at-least-two optical sensing elements. Step d) includes calculating an average second-reflectivity value of the second-reflectivity reference values for each of the at-least-two optical sensing elements. Step e) includes calculating an offset value for the one optical sensing element using at least the average first-reflectivity and second-reflectivity values of steps c) and d). Step f) includes calibrating the one optical sensing element using at least the offset value calculated in step e).

A fifth method of the invention is for shading one of a first plurality of optical sensing elements of a scan bar. The fifth method includes steps a) through e). Step a) includes obtaining one or more white and black reference values for each of a second plurality of optical sensing elements of the scan bar. Step b) includes calculating at least one nominal white reference value for each optical sensing element of the second plurality. Step c) includes calculating at least one nominal black reference value for each optical sensing element of the second plurality. Step d) includes calculating a black offset value for the one optical sensing element of the first plurality by using a fitting algorithm to fit the curve of the nominal white values into the range of the nominal black values. Step e) includes calibrating the one optical sensing element of the first plurality using at least the black offset value calculated in step d).

Several benefits and advantages are derived from at least one of the first through fifth methods of the invention. In one example, by calculating a black offset value, for use in shading the one optical sensing element, by using a least-squares or other linear fitting algorithm to fit the curve of the average white (or black) values into the range of the average black (or white) values of the at-least-two optical sensing elements of a movable scan bar of a scanner, inaccurate and unwanted vertical dark (or white) streaks are reduced or eliminated when displaying and/or printing a scanned image. In one application, the average black values are noisier than the average white values, and the average black values are made less noisy and an improved black offset value calculated by fitting the curve of the average white values of the sensing elements into the range of the average black values of the sensing elements.

DETAILED DESCRIPTION

Figure 1:
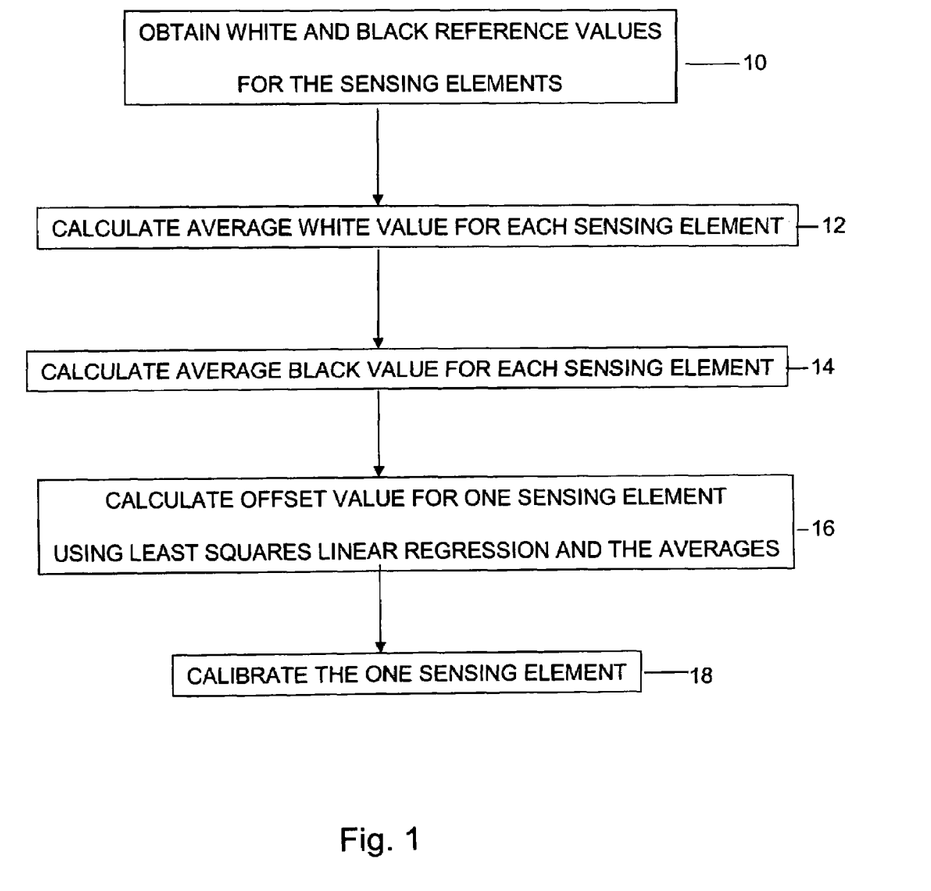
FIG. 1 is a block diagram of a first method of the invention.

FIG. 1 is a block diagram of a first method of the invention which is for shading one of a plurality of optical sensing elements of a scan bar of an optical scanner having a shading calibration strip including a white area and a black area. It is noted that, for the first method, a shading calibration strip is defined as an area (whether having the shape of a strip or a non-strip) of the optical scanner which is adapted to be scanned by the scan bar to calibrate the output signal of each optical sensing element. The first method includes steps a) through e). Step a) is labeled as "Obtain White And Black Reference Values For The Sensing Elements" in block 10 of FIG. 1. Step a) includes obtaining white and black reference values of the output signal of each of the plurality of optical sensing elements while relatively moving the scan bar over the white and black areas of the shading calibration strip. In one non-limiting example, a reference value of the output signal of an optical sensing element ranges from 0 to 4095. Step b) is labeled as "Calculate Average White Value For Each Sensing Element" in block 12 of FIG. 1. Step b) includes calculating an average white value of the white reference values for each of the plurality of optical sensing elements. Step c) is labeled as "Calculate Average Black Value For Each Sensing Element" in block 14 of FIG. 1. Step c) includes calculating an average black value of the black reference values for each of the plurality of optical sensing elements. Step d) is labeled as "Calculate Black Offset Value For One Sensing Element Using Least Squares Linear Regression And The Averages" in block 16 of FIG. 1. Step d) includes calculating a black offset value for the one optical sensing element by using a least squares linear regression algorithm to fit the curve of the average white values into the range of the average black values of the plurality of optical sensing elements. Applying a least squares linear regression algorithm in step d) is within the ordinary level of skill of the artisan. Step e) is labeled as "Calibrate The One Sensing Element" in block 18 of FIG. 1. Step e) includes calibrating the one optical sensing element using at least the black offset value calculated in step d).

Examples of optical sensing elements include, without limitation, CCD (charge-coupled-device) elements, CIS elements, and CMOS elements. Other examples of optical sensing elements are left to the artisan.

In one implementation of the first method, the plurality is all of the optical sensing elements of the scan bar. In one application of the first method, each average white value of step b) is an average white value of white reference values determined not to have come from an optical defect on the white area. In one variation, each average black value of step c) is an average black value of black reference values determined not to have come from an optical defect on the black area. In one modification, the average black value for the one optical sensing element is a smoothed average black value for the one optical sensing element which is an average value of the average black values of the one optical sensing element and at least some of the rest of the plurality of optical sensing elements. In one example of the first method, an average value is a mean value. In another example, an average value is a median value. Other implementations, applications, variations, modifications, and examples are left to the artisan.

In one employment of the first method, step e) includes calibrating a non-reference value of the output signal of the one optical sensing element by subtracting the black offset value from the non-reference value and then multiplying by a gain. In one application, the non-reference value is one of the values of the output signal of the one optical sensing element as it moves over a text image and/or a non-text image. In one illustration, the gain is calculated by dividing the difference between desired white and black reference values by the difference between the average white and black values for the one optical sensing element. Other techniques for calibrating a non-reference value of the output signal of the one optical sensing element utilizing the black offset value and other techniques for calculating the gain are left to the artisan. In one extension of the first method, each of the other of the plurality of optical sensing elements is calibrated in a like manner as the calibration of the one optical sensing element.

In one illustration of employing a least squares linear regression algorithm, wherein BO is the black offset value for the one optical sensing element, $$BO=(a \cdot W)+b,$$

wherein:

a is the slope of a line approximating the data set of average white and black values;

W is the average white value for the one optical sensing element;

b is the intercept of the line;

$$a=(m \cdot SWB-(SW \cdot SB))/D;$$

$$b=((SW2 \cdot SB)-(SWB \cdot SW))/D;$$

m is the number of the plurality of optical sensing elements;

SWB is the sum of the product of the average white and black values;

SW is the sum of the average white values for the plurality of optical sensing elements;

SB is the sum of the average black values;

$$D=m \cdot SW2-(SW \cdot SW);\ \text{and}$$

SW2 is the sum of the squared white values.

Figure 2:
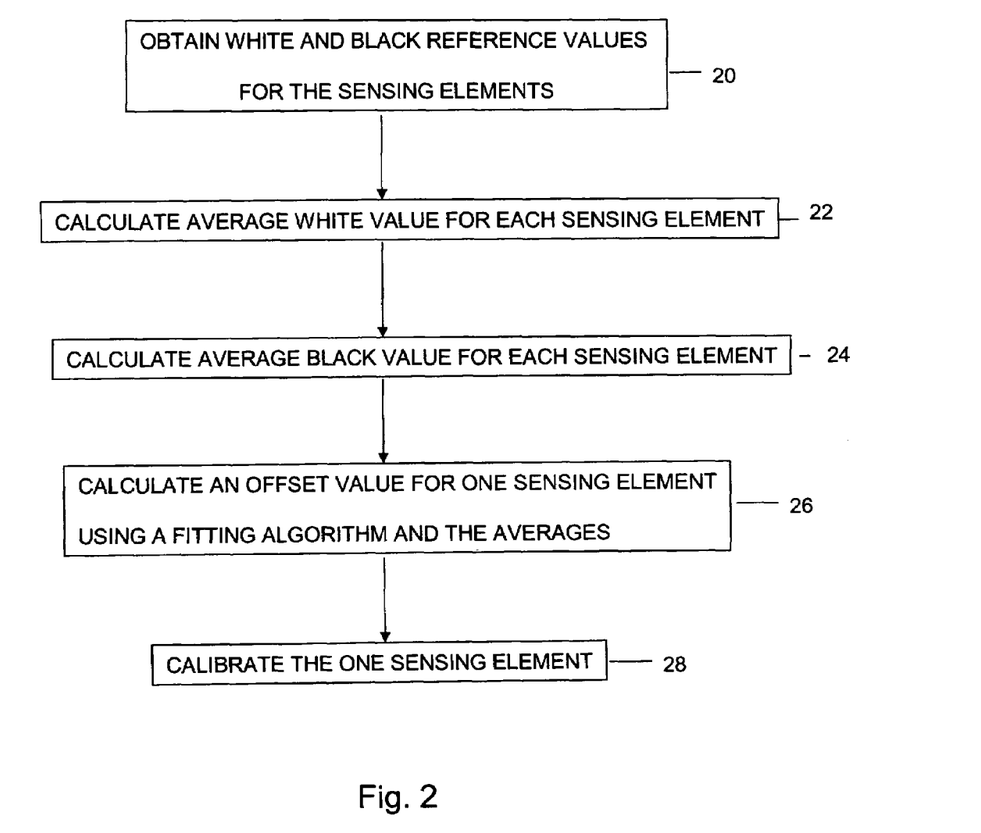
FIG. 2 is a block diagram of a second method of the invention.

FIG. 2 is a block diagram of a second method of the invention which is for shading one of a plurality of optical sensing elements of a scan bar of an optical scanner having a shading reference target including a white area and a black area. The second method includes steps a) through e). Step a) is labeled as "Obtain White And Black Reference Values For The Sensing Elements" in block 20 of FIG. 2. Step a) includes obtaining white and black reference values of the output signal of each of the plurality of optical sensing elements while relatively moving the scan bar over the white and black areas of the shading reference target. Step b) is labeled as "Calculate Average White Value For Each Sensing Element" in block 22 of FIG. 2. Step b) includes calculating an average white value of the white reference values for each of the plurality of optical sensing elements. Step c) is labeled as "Calculate Average Black Value For Each Sensing Element" in block 24 of FIG. 2. Step c) includes calculating an average black value of the black reference values for each of the plurality of optical sensing elements. Step d) is labeled as "Calculate An Offset Value For One Sensing Element Using A Fitting Algorithm And The Averages" in block 26 of FIG. 2. Step d) includes calculating an offset value for the one optical sensing element by using a fitting algorithm to fit the curve of one of the average white and black values into the range of the other of the average white and black values of the plurality of optical sensing elements. Applying a fitting algorithm in step d) is within the ordinary level of skill of the artisan. Step e) is labeled as "Calibrate The One Sensing Element" in block 28 of FIG. 2. Step e) includes calibrating the one optical sensing element using at least the black offset value calculated in step d).

In one implementation of the second method, the plurality is all of the sensing elements of the scan bar. In one application of the second method, each average white value of step b) is an average white value of white reference values determined not to have come from an optical defect on the white area. In one variation, each average black value of step c) is an average black value of black reference values determined not to have come from an optical defect on the black area. In one modification, the average black value for the one sensing element is a smoothed average black value for the one sensing element which is an average value of the average black values of the one sensing element and at least some of the rest of the plurality of sensing elements. In one example of the second method, an average value is a mean value. In another example, an average value is a median value. Other implementations, applications, variations, modifications, and examples are left to the artisan.

In one employment of the second method, step d) calculates a white offset value for the one optical sensing element by using a linear fitting algorithm to fit the curve of the average white values into the range of the average black values. In one variation, step e) includes calibrating a non-reference value of the output signal of the one optical sensing element by subtracting the black offset value from the non-reference value and then multiplying by a gain. In one illustration, the gain is calculated by dividing the difference between desired white and black reference values by the difference between the average white and black values for the one optical sensing element. Other techniques for calibrating a non-reference value of the output signal of the one optical sensing element utilizing the black offset value and other techniques for calculating the gain are left to the artisan. In one extension of the second method, each of the other of the plurality of optical sensing elements is calibrated in a like manner as the calibration of the one optical sensing element.

In one illustration of employing a linear fitting algorithm in calculating a black offset value, the linear fitting algorithm is the previously described illustration of a least squares linear regression algorithm.

In another illustration of employing a linear fitting algorithm in calculating a black offset value, wherein a "min-max" linear fitting algorithm is employed and wherein BO is the black offset for the one optical sensing element, $$BO=s \cdot (W-Wm)+Bm,$$

wherein:

$$s=(BM-Bm)/(WM-Wm);$$

W is the average white value for the one optical sensing element;

Wm is the minimum average white value of the plurality of optical sensing elements;

Bm is the minimum average black value of the plurality of optical sensing elements;

BM is the maximum average black value of the plurality of optical sensing elements; and WM is the maximum average white value of the plurality of optical sensing elements.

Other illustrations of employing a linear or a non-linear fitting algorithm in calculating a black offset value are left to the artisan.

In another employment of the second method, step d) calculates a white offset value for the one optical sensing element by using a linear fitting algorithm to fit the curve of the average black values into the range of the average white values. In one variation, step e) includes calibrating a non-reference value of the output signal of the one optical sensing element by adding the white offset value to the non-reference value and then multiplying by a gain. In one illustration, the gain is calculated by dividing the difference between desired white and black reference values by the difference between the average white and black values for the one optical sensing element. Other techniques for calibrating a non-reference value of the output signal of the one optical sensing element utilizing the white offset value and other techniques for calculating the gain are left to the artisan. In one extension of the second method, each of the other of the plurality of optical sensing elements is calibrated in a like manner as the calibration of the one optical sensing element. In one illustration the previously described application of a least squares linear regression algorithm or a "min-max" linear fitting algorithm is modified to be employed for calculating a white offset value, as is within the ordinary level of skill of the artisan.

Figure 3:
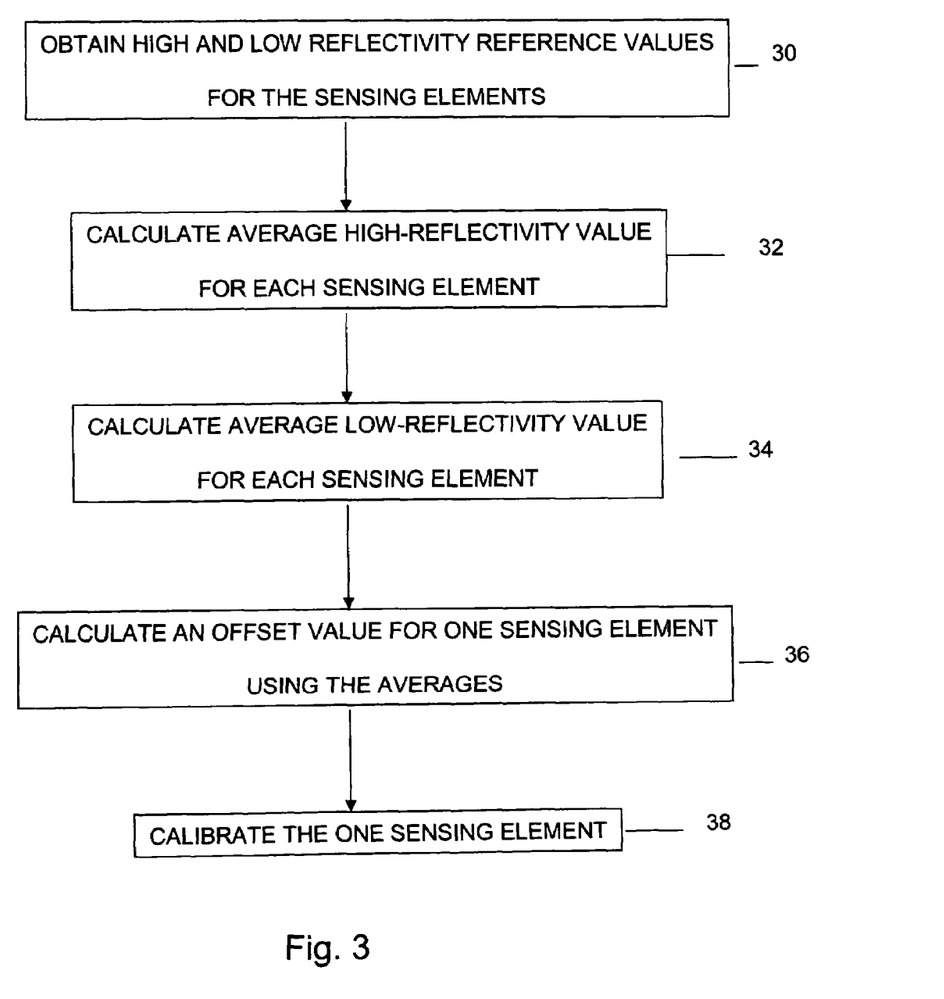
FIG. 3 is a block diagram of a third method of the invention.

FIG. 3 is a block diagram of a third method of the invention which is for shading one of a plurality of optical sensing elements of an optical sensor. The third method includes steps a) through e). Step a) is labeled as "Obtain High-Reflectivity and Low-Reflectivity Reference Values For The Sensing Elements" in block 30 of FIG. 3. Step a) includes obtaining high-reflectivity and low-reflectivity reference values of the output signal of each of the plurality of optical sensing elements while relatively moving the optical sensor over a high-reflectivity target area and a low-reflectivity target area of a shading reference target. Step b) is labeled as "Calculate Average High-Reflectivity Value For Each Sensing Element" in block 32 of FIG. 3. Step b) includes calculating an average high-reflectivity value of the high-reflectivity reference values for each of the plurality of optical sensing elements. Step c) is labeled as "Calculate Average Low-Reflectivity Value For Each Sensing Element" in block 34 of FIG. 3. Step c) includes calculating an average low-reflectivity value of the low-reflectivity reference values for each of the plurality of optical sensing elements. Step d) is labeled as "Calculate An Offset Value For One Sensing Element Using the Averages" in block 36 of FIG. 3. Step d) includes calculating an offset value for the one optical sensing element using at least the average high-reflectivity and low-reflectivity values of steps b) and c). Step e) is labeled as "Calibrate The One Sensing Element" in block 38 of FIG. 3. Step e) includes calibrating the one optical sensing element using at least the offset value calculated in step d).

In one implementation of the third method, the plurality is all of the optical sensing elements of the optical sensor. In one application of the third method, the offset is a low-reflectivity offset. In another application, the offset is a high-reflectivity offset as can be appreciated by those skilled in the art. In one example of the third method, step d) employs a linear fitting algorithm. Other implementations and examples are left to the artisan.

Figure 4:
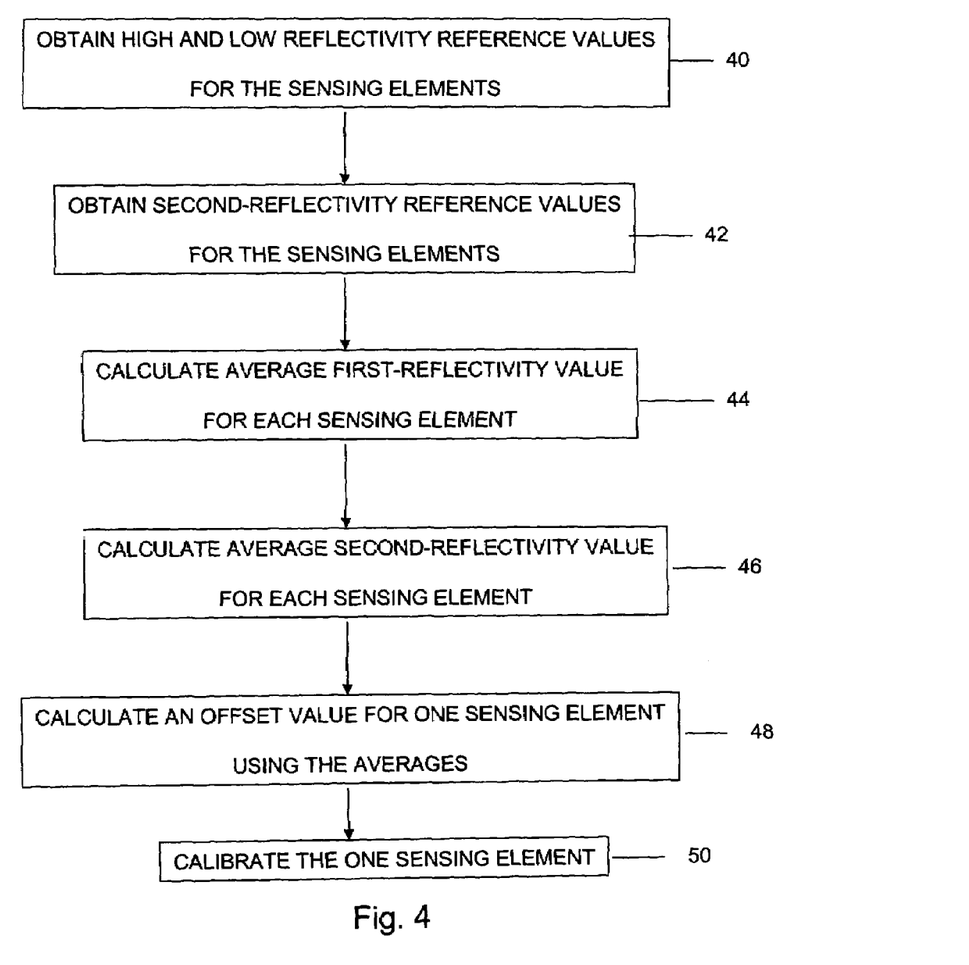
FIG. 4 is a block diagram of a fourth method of the invention.

A fourth method of the invention is for shading one of a plurality of optical sensing elements of an optical sensor. The fourth method includes steps a) through f). Step a) is labeled as "Obtain first-Reflectivity Reference Values For The Sensing Elements" in block 40 of FIG. 4. Step a) includes obtaining first-reflectivity reference values of the output signal of each of the plurality of optical sensing elements while relatively moving the optical sensor over a substantially illuminated target area of a shading reference target. Step b)is labeled as "Obtain Second-Reflectivity Reference Values For The Sensing Elements" in block 42 of FIG. 4. Step b) includes obtaining second-reflectivity reference values of the output signal of each of the plurality of optical sensing elements in a substantially non-illuminated environment. Step c) is labeled as "Calculate Average First-Reflectivity Value For Each Sensing Element" in block 44 of FIG. 4. Step c) includes calculating an average first-reflectivity value of the first-reflectivity reference values for each of the plurality of optical sensing elements. Step d) is labeled as "Calculate Average Second-Reflectivity Value For Each Sensing Element" in block 46 of FIG. 4. Step d) includes calculating an average second-reflectivity value of the second-reflectivity reference values for each of the plurality of optical sensing elements. Step e) is labeled as "Calculate An Offset Value For One Sensing Element Using The Averages" in block 48 of FIG. 4. Step e) includes calculating an offset value for the one optical sensing element using at least the average first-reflectivity and second-reflectivity values of steps c) and d). Step f) is labeled as "Calibrate The One Sensing Element" in block 50 of FIG. 4. Step f) includes calibrating the one optical sensing element using at least the offset value calculated in step e).

A fifth method of the invention is for shading one of a first plurality of optical sensing elements of a scan bar. The fifth method includes steps a) through e). Step a) is labeled as "Obtain White And Black Reference Values For Each Of A Second Plurality Of The Sensing Elements" in block 52 of FIG. 5. Step a) includes obtaining one or more white and black reference values for each of a second plurality of optical sensing elements of the scan bar. Step b) is labeled as "Calculate A Nominal White Reference Value For Each Sensing Element Of The Second Plurality" in block 54 of FIG. 5. Step b) includes calculating at least one nominal white reference value for each optical sensing element of the second plurality. Step c) is labeled as "Calculate A Nominal Black Reference Value For Each Sensing Element Of The Second Plurality" in block 56 of FIG. 5. Step c) includes calculating at least one nominal black reference value for each optical sensing element of the second plurality. Step d) is labeled as "Calculate A Black Offset Value For The One Sensing Element Of The First Plurality Using A Fitting Algorithm And The Nominal Values" in block 58 of FIG. 5. Step d) includes calculating a black offset value for the one optical sensing element of the first plurality by using a fitting algorithm to fit the curve of the nominal white values into the range of the nominal black values. Step e) is labeled as "Calibrate The One Sensing Element Of the First Plurality" in step 60 of FIG. 5. Step e) includes calibrating the one optical sensing element of the first plurality using at least the black offset value calculated in step d).

Figure 5:
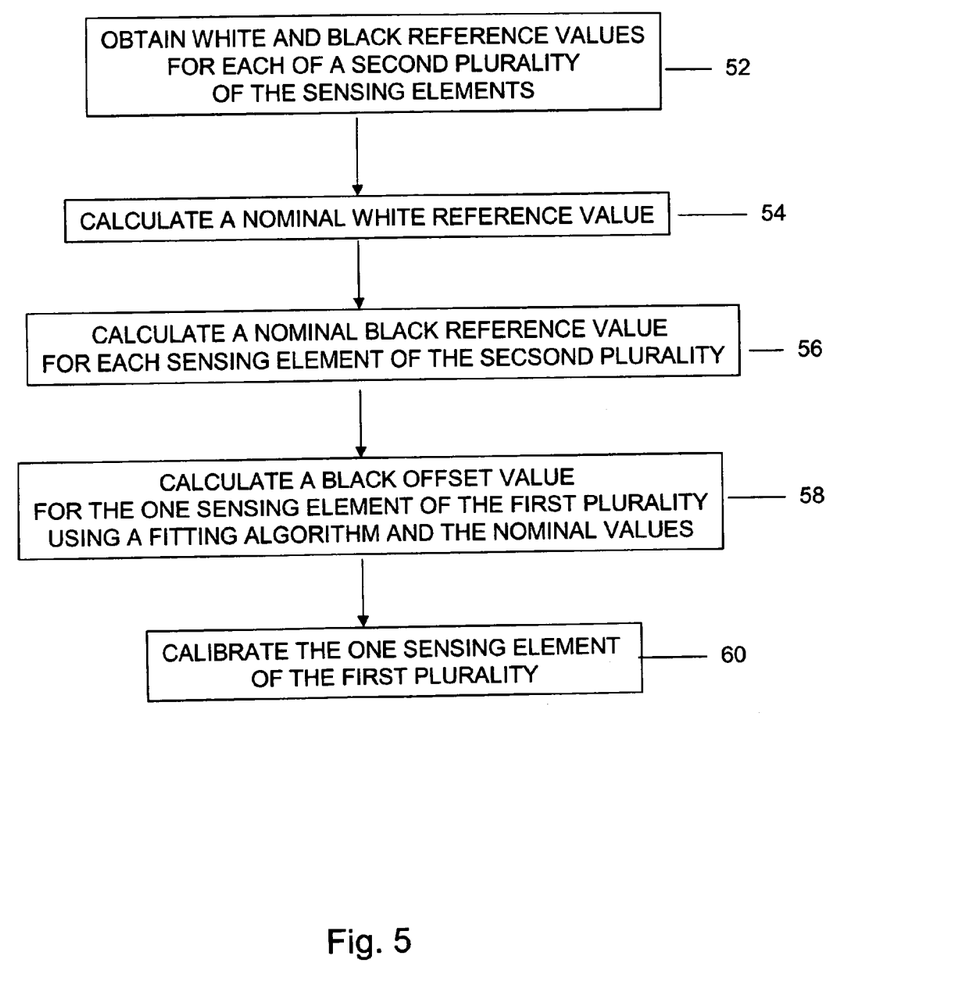
FIG. 5 is a block diagram of a fifth method of the invention.

In one example of the fifth method, the first and second pluralities are identical. In another example, the first plurality is a subset of the second plurality. In an additional example, the second plurality is a subset of the first plurality. In one implementation of the fifth method, the white and black reference values are obtained from the scan bar scanning a calibration target having both a white and a black reference area. In one application of the fifth method, the fitting algorithm is a least squares linear regression algorithm.

Several benefits and advantages are derived from at least one of the first through fifth methods of the invention. In one example, by calculating a black offset value, for use in shading the one optical sensing element, by using a least-squares or other linear fitting algorithm to fit the curve of the average white (or black) values into the range of the average black (or white) values of the at-least-two optical sensing elements of a movable scan bar of a scanner, inaccurate and unwanted vertical dark (or white) streaks are reduced or eliminated when displaying and/or printing a scanned image. In one application, the average black values are noisier than the average white values, and the average black values are made less noisy and an improved black offset value calculated by fitting the curve of the average white values of the sensing elements into the range of the average black values of the sensing elements.

The foregoing description of several methods of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for shading one of a plurality of optical sensing elements of a scan bar of an optical scanner having a shading calibration strip including a white area and a black area comprising the steps of:
   a) obtaining white and black reference values of the output signal of each of the plurality of optical sensing elements while relatively moving the scan bar over the white and black areas of the shading calibration strip;
   b) calculating an average white value of the white reference values for each of the plurality of optical sensing elements;
   c) calculating an average black value of the black reference values for each of the plurality of optical sensing elements;
   d) calculating a black offset value for the one optical sensing element by using a least squares linear regression algorithm to fit the curve of the average white values into the range of the average black values of the plurality of optical sensing elements; and
   e) calibrating the one optical sensing element using at least the black offset value calculated in step d).

2. The method of claim 1, wherein the plurality is all of the optical sensing elements of the scan bar.

3. The method of claim 1, wherein each average white value of step b) is an average white value of white reference values determined not to have come from an optical defect on the white area.

4. The method of claim 3, wherein each average black value of step c) is an average black value of black reference values determined not to have come from an optical defect on the black area.

5. The method of claim 4, wherein each average white value of step b) is a mean value, and wherein each average black value of step c) is a mean value.

6. The method of claim 1, wherein step e) includes calibrating a non-reference value of the output signal of the one optical sensing element by subtracting the black offset value from the non-reference value and then multiplying by a gain.

7. The method of claim 6, wherein the gain is calculated by dividing the difference between desired white and black reference values by the difference between the average white and black values for the one optical sensing element.

8. A method for shading one of a plurality of optical sensing elements of a scan bar of an optical scanner having a shading reference target including a white area and a black area comprising the steps of:
   a) obtaining white and black reference values of the output signal of each of the plurality of optical sensing elements while relatively moving the scan bar over the white and black areas of the shading reference target;
   b) calculating an average white value of the white reference values for each of the plurality of optical sensing elements;
   c) calculating an average black value of the black reference values for each of the plurality of optical sensing elements;
   d) calculating an offset value for the one optical sensing element by using a fitting algorithm to fit the curve of one of the average white and black values into the range of the other of the average white and black values of the plurality of optical sensing elements; and
   e) calibrating the one optical sensing element using at least the offset value calculated in step d).

9. The method of claim 8, wherein the plurality is all of the optical sensing elements of the scan bar.

10. The method of claim 8, wherein each average white value of step b) is an average white value of white reference values determined not to have come from an optical defect on the white area.

11. The method of claim 10, wherein each average black value of step c) is an average black value of black reference values determined not to have come from an optical defect on the black area.

12. The method of claim 11, wherein each average white value of step b) is a mean value, and wherein each average black value of step c) is a mean value.

13. The method of claim 8, wherein step d) calculates a black offset value for the one optical sensing element by using a linear fitting algorithm to fit the curve of the average white values into the range of the average black values.

14. The method of claim 13, wherein step e) includes calibrating a non-reference value of the output signal of the one optical sensing element by subtracting the black offset value from the non-reference value and then multiplying by a gain.

15. The method of claim 14, wherein the gain is calculated by dividing the difference between desired white and black reference values by the difference between the average white and black values for the one optical sensing element.

16. The method of claim 8, wherein step d) calculates a white offset value for the one optical sensing element by using a linear fitting algorithm to fit the curve of the average black values into the range of the average white values.

17. The method of claim 16, wherein step e) includes calibrating a non-reference value of the output signal of the one optical sensing element by adding the white offset value to the non-reference value and then multiplying by a gain.

18. The method of claim 17, wherein the gain is calculated by dividing the difference between desired white and black reference values by the difference between the average white and black values for the one optical sensing element.

19. A method for shading one of a plurality of optical sensing elements of an optical sensor comprising the steps of:
   a) obtaining high-reflectivity and low-reflectivity reference values of the output signal of each of the plurality of optical sensing elements while relatively moving the optical sensor over a high-reflectivity target area and a low-reflectivity target area of a shading reference target;
   b) calculating an average high-reflectivity value of the high-reflectivity reference values for each of the plurality of optical sensing elements;
   c) calculating an average low-reflectivity value of the low-reflectivity reference values for each of the plurality of optical sensing elements;
   d) calculating an offset value for the one optical sensing element by using a fitting algorithm to fit the curve of one of the average high-reflectivity and low-reflectivity values into the range of the other of the average high-reflectivity and low-reflectivity values of the plurality of optical sensing elements; and
   e) calibrating the one optical sensing element using at least the offset value calculated in step d).

20. The method of claim 19, wherein the plurality is all of the optical sensing elements of the optical sensor.

21. A method for shading one of a plurality of optical sensing elements of an optical sensor comprising the steps of:
   a) obtaining first-reflectivity reference values of the output signal of each of the plurality of optical sensing elements while relatively moving the optical sensor over a substantially illuminated target area of a shading reference target;
   b) obtaining second-reflectivity reference values of the output signal of each of the plurality of optical sensing elements in a substantially non-illuminated environment;
   c) calculating an average first-reflectivity value of the first-reflectivity reference values for each of the plurality of optical sensing elements;
   d) calculating an average second-reflectivity value of the second-reflectivity reference values for each of the plurality of optical sensing elements;
   e) calculating an offset value for the one optical sensing element by using a fitting algorithm to fit the curve of one of the average first-reflectivity and second-reflectivity values into the range of the other of the average first-reflectivity and second-reflectivity values of the plurality of optical sensing elements; and
   f) calibrating the one optical sensing element using at least the offset value calculated in step e).

22. A method for shading one of a first plurality of optical sensing elements of a scan bar comprising the steps of:
   a) obtaining one or more white and black reference values for each of a second plurality of optical sensing elements of the scan bar;
   b) calculating at least one nominal white reference value for each optical sensing element of the second plurality;
   c) calculating at least one nominal black reference value for each optical sensing element of the second plurality;
   d) calculating a black offset value for the one optical sensing element of the first plurality by using a fitting algorithm to fit the curve of the nominal white values into the range of the nominal black values; and
   e) calibrating the one optical sensing element of the first plurality using at least the black offset value calculated in step d).

23. The method of claim 22, wherein the first and second pluralities are identical.

24. The method of claim 22, wherein the white and black reference values are obtained from the scan bar scanning a calibration target having both a white and a black reference area.

25. The method of claim 22, wherein the fitting algorithm is a least squares linear regression algorithm.

* * * * *